US009839063B2

(12) United States Patent
Tanaka et al.

(10) Patent No.: US 9,839,063 B2
(45) Date of Patent: Dec. 5, 2017

(54) IP MULTIMEDIA SUBSYSTEM, PROXY SESSION CONTROL APPARATUS, AND COMMUNICATION CONTROL METHOD

(71) Applicant: NTT DOCOMO, INC., Tokyo (JP)

(72) Inventors: Itsuma Tanaka, Tokyo (JP); Masaki Machimoto, Tokyo (JP); Kenta Oonishi, Tokyo (JP); Zhen Miao, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 121 days.

(21) Appl. No.: 15/024,818

(22) PCT Filed: Sep. 22, 2014

(86) PCT No.: PCT/JP2014/074999
§ 371 (c)(1),
(2) Date: Mar. 24, 2016

(87) PCT Pub. No.: WO2015/046099
PCT Pub. Date: Apr. 2, 2015

(65) Prior Publication Data
US 2016/0249401 A1 Aug. 25, 2016

(30) Foreign Application Priority Data
Sep. 24, 2013 (JP) ................................. 2013-197532

(51) Int. Cl.
*H04W 76/02* (2009.01)
*H04M 3/00* (2006.01)
(Continued)

(52) U.S. Cl.
CPC ....... *H04W 76/028* (2013.01); *H04L 65/1016* (2013.01); *H04L 65/1046* (2013.01);
(Continued)

(58) Field of Classification Search
None
See application file for complete search history.

(56) References Cited

U.S. PATENT DOCUMENTS 8,238,267 B2 * 8/2012 Dwyer .............. H04W 36/0022
370/254
9,191,960 B2 * 11/2015 Garcia Martin .... H04W 72/048
(Continued)

FOREIGN PATENT DOCUMENTS

JP 2006-157612 A 6/2006
JP 2009-182541 A 8/2009
(Continued)

OTHER PUBLICATIONS

International Search Report issued in PCT/JP2014/074999 dated Dec. 16, 2014 (2 pages).
(Continued)

*Primary Examiner* — Bunjob Jaroenchonwanit
(74) *Attorney, Agent, or Firm* — Osha Liang LLP

(57) ABSTRACT

A P-CSCF (310) includes a terminating call processing unit (311) which receives SIP INVITE from an S-CSCF. The SIP INVITE includes an identifier of UE, and is relayed in response to acceptance of a terminating call to the UE. The P-CSCF (310) further includes: a restoration execution unit (313) which executes restoration of a subscriber profile linked with the UE based on reception of the SIP INVITE; and an address holding unit (315) which holds an address of a PCRF included in a response received from a DRA along with the execution of the restoration. The restoration execution unit reestablishes a session between the UE and the PCRF based on the held address of the PCRF, and causes the UE to execute re-registration with an IP multimedia subsystem.

7 Claims, 12 Drawing Sheets

(51) Int. Cl.
*H04W 8/18* (2009.01)
*H04L 29/08* (2006.01)
*H04L 29/06* (2006.01)

(52) U.S. Cl.
CPC ...... *H04L 65/1069* (2013.01); *H04L 65/1073* (2013.01); *H04L 67/306* (2013.01); *H04M 3/00* (2013.01); *H04W 8/18* (2013.01)

(56) References Cited

U.S. PATENT DOCUMENTS

| | | | |
|---|---|---|---|
| 9,258,368 B2* | 2/2016 | Rasanen | H04L 67/14 |
| 2006/0133356 A1 | 6/2006 | Suzukawa | |
| 2008/0256251 A1* | 10/2008 | Huotari | H04L 67/16 |
| | | | 709/229 |
| 2009/0270066 A1* | 10/2009 | Noguchi | H04L 47/10 |
| | | | 455/404.2 |
| 2010/0177767 A1* | 7/2010 | Ishii | H04W 8/04 |
| | | | 370/352 |
| 2010/0287406 A1* | 11/2010 | Ishii | H04L 45/22 |
| | | | 714/4.1 |
| 2011/0099604 A1* | 4/2011 | Zhou | H04L 12/14 |
| | | | 726/1 |
| 2011/0141947 A1* | 6/2011 | Li | H04M 3/2281 |
| | | | 370/259 |
| 2013/0010804 A1* | 1/2013 | Fernandez Alonso | H04L 65/1016 |
| | | | 370/428 |
| 2013/0279406 A1* | 10/2013 | Merino Vazquez | H04M 15/66 |
| | | | 370/328 |
| 2014/0185490 A1* | 7/2014 | Holm | H04L 41/0893 |
| | | | 370/259 |
| 2015/0195864 A1* | 7/2015 | Bartolome Rodrigo | H04W 76/028 |
| | | | 370/221 |
| 2015/0264629 A1* | 9/2015 | Rasanen | H04W 48/04 |
| | | | 455/456.1 |
| 2016/0014621 A1* | 1/2016 | Karampatsis | H04L 41/0893 |
| | | | 370/328 |
| 2016/0286598 A1* | 9/2016 | Avula | H04W 76/028 |

FOREIGN PATENT DOCUMENTS

| | | |
|---|---|---|
| WO | 2008/123562 A1 | 10/2008 |
| WO | 2009039890 A1 | 4/2009 |
| WO | 2011131240 A1 | 10/2011 |
| WO | 2013/137035 A1 | 9/2013 |

OTHER PUBLICATIONS

Written Opinion of the International Searching Authority issued in PCT/JP2014/074999 dated Dec. 16, 2014 (3 pages).
3GPP TS 23.380 V9.5.0; "3rd Generation Partnership Project; Technical Specification Group Core Network and Terminals; IMS Restoration Procedures (Release 9)"; Sep. 2012 (16 pages).
Extended Search Report issued in the counterpart European Patent Application No. 14850090.3, dated Aug. 25, 2016 (7 pages).

* cited by examiner

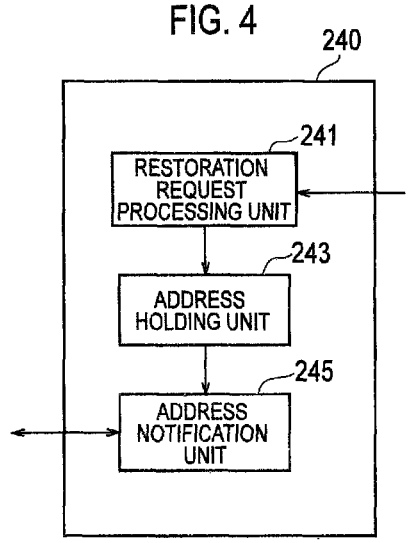
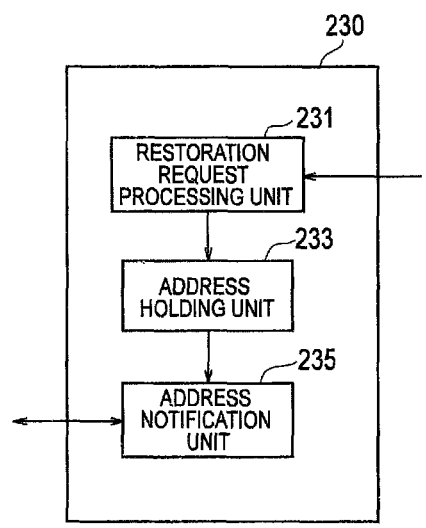

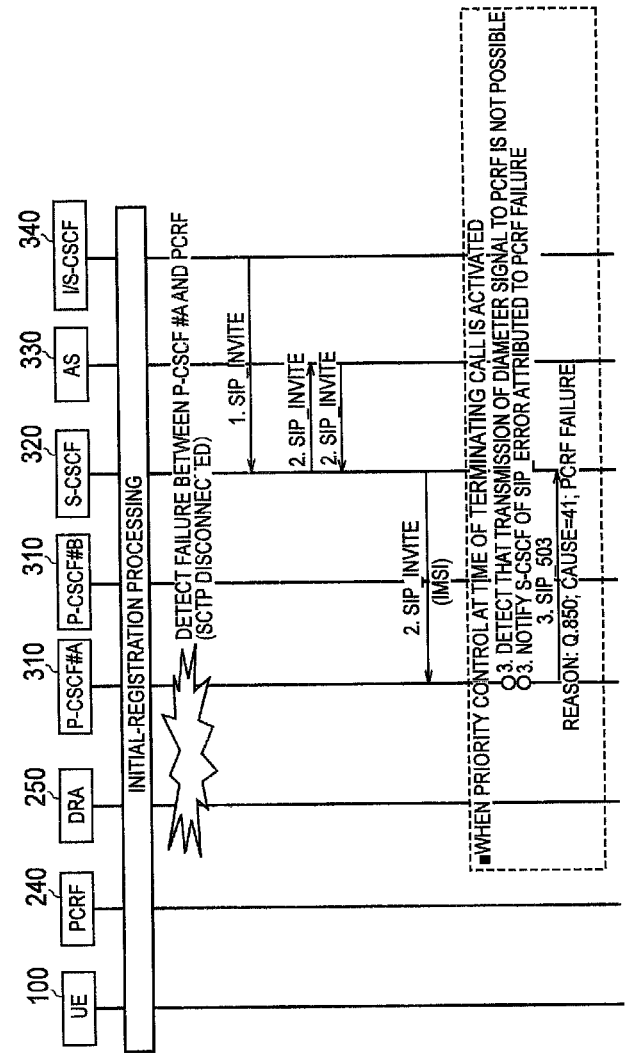

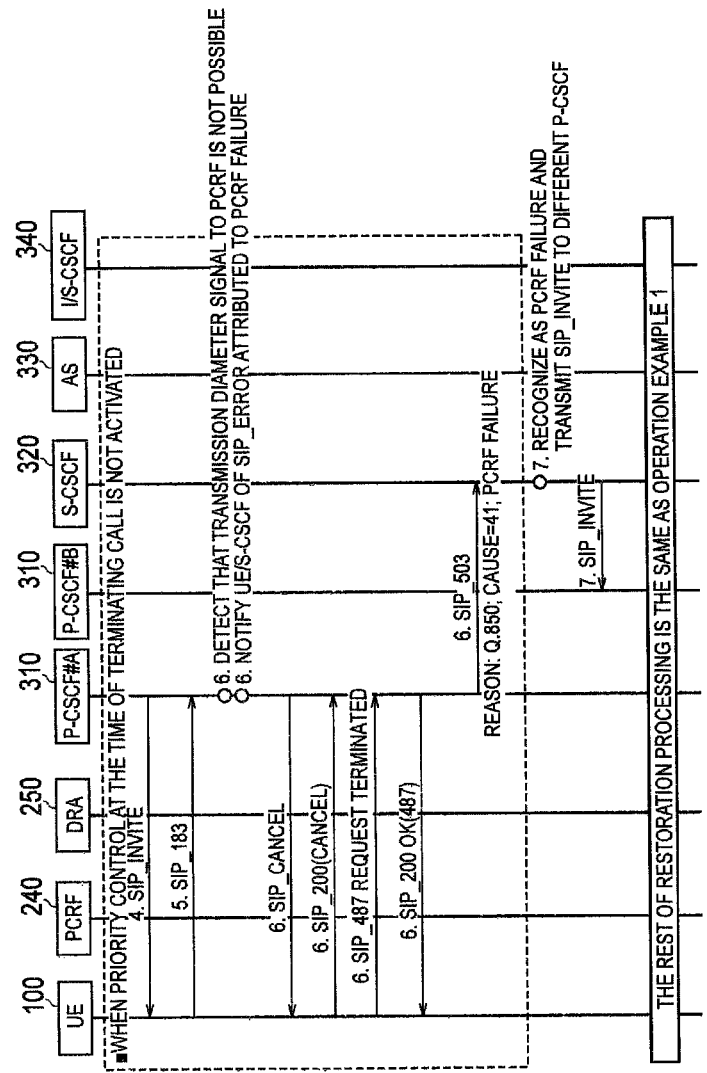

IP MULTIMEDIA SUBSYSTEM, PROXY SESSION CONTROL APPARATUS, AND COMMUNICATION CONTROL METHOD

TECHNICAL FIELD

The present invention relates to an IP multimedia subsystem, a proxy session control apparatus, and a communication control method.

BACKGROUND ART

The 3rd Generation Partnership Project (3GPP) stipulates that user equipment (UE) needs to satisfy a state of being registered (a registration state) with an IP-CAN in order that the UE can use a service through an IP Multimedia core network Subsystem (IMS). As for the registration state of the UE, a session control apparatus, or more specifically, a Proxy-Call Session Control Function (P-CSCF) located at an interface with an IP access network (IP-CAN) holds a subscriber profile of the UE (an identifier, subscription information, and the like of the UE).

Whether or not the P-CSCF is operating normally is diagnosed by a Keep-alive function (a Heartbeat function) executed regularly between a Packet Data Network Gateway (PGW) and the P-CSCF. There has been defined a method in which, if the P-CSCF is diagnosed as not operating normally, the PGW prompts UE, which is registered with the P-CSCF, to perform re-registration via the network (see Non-patent Document 1, for example).

PRIOR ART DOCUMENT

Non-Patent Document

Non-patent document 1: 3GPP TS 23.380 V9.5.0 Clause 5 Recovery after P-CSCF failure, 3rd Generation Partnership Project; Technical Specification Group Core Network and Terminals; IMS Restoration Procedures (Release 9), 3GPP, September 2012

SUMMARY OF THE INVENTION

However, the above-described method of prompting the UE to perform the re-registration via the network has the following problems. Specifically, the UE which can execute the re-registration in accordance with this method is limited to UE that is compatible with Release 9 or later. In other words, UE compatible with Release 8 or earlier does not comply with this method.

Moreover, the diagnosis of the P-CSCF by the Keep-alive function can diagnose whether or not the P-CSCF itself is dead or alive, but cannot diagnose a state in which part of the subscriber profile held by the P-CSCF is missing, for example. Furthermore, when the P-CSCF is diagnosed as not operating normally as a result of the diagnosis of the P-CSCF by the Keep-alive function, the method prompts all the UE registered with the P-CSCF to perform the re-registration. As a consequence, control signals transmitted and received along with the re-registration are temporarily increased, whereby a load on the network is likely to become higher.

The present invention has been made in view of the aforementioned circumstances. An objective of the present invention is to provide an IP multimedia subsystem, a proxy session control apparatus, and a communication control method, which are capable of causing user equipment to execute re-registration depending on an operating condition of a proxy session control apparatus (P-CSCF) irrespective of a release version that the user equipment is compatible with.

In summary, a first feature of the present invention provides an IP multimedia subsystem including: a serving session control apparatus configured to execute session control of user equipment; and a proxy session control apparatus connected to the serving session control apparatus and located at an interface with an IP access network. The serving session control apparatus includes: a terminating call acceptance unit configured to accept a terminating call to the user equipment; and a terminating call relay unit configured to relay terminating call information including an identifier of the user equipment to the proxy session control apparatus in response to acceptance of the terminating call to the user equipment by the terminating call acceptance unit. The proxy session control apparatus includes: a terminating call processing unit configured to receive the terminating call information from the serving session control apparatus; a restoration execution unit configured to execute restoration of a subscriber profile linked with the user equipment based on reception of the terminating call information by the terminating call processing unit; and an address holding unit configured to hold an address of a policy-and-charging apparatus included in a response received from a routing agent along with the execution of the restoration by the restoration execution unit. The restoration execution unit reestablishes a session between the user equipment and the policy-and-charging apparatus based on the address of the policy-and-charging apparatus held by the address holding unit, and causes the user equipment to execute re-registration with the IP multimedia subsystem.

In summary, a second feature of the present invention provides a proxy session control apparatus constituting an IP multimedia subsystem and located at an interface with an IP access network, including: a terminating call processing unit configured to receive terminating call information from a serving session control apparatus configured to execute session control of user equipment, the terminating call information including an identifier of the user equipment and being relayed in response to acceptance of a terminating call to the user equipment; a restoration execution unit configured to execute restoration of a subscriber profile linked with the user equipment based on reception of the terminating call information by the terminating call processing unit; and an address holding unit configured to hold an address of a policy-and-charging apparatus included in a response received from a routing agent along with the execution of the restoration by the restoration execution unit. The restoration execution unit reestablishes a session between the user equipment and the policy-and-charging apparatus based on the address of the policy-and-charging apparatus held by the address holding unit, and causes the user equipment to execute re-registration with the IP multimedia subsystem.

In summary, a third feature of the present invention provides a communication control method implemented by an IP multimedia subsystem provided with: a serving session control apparatus configured to execute session control of user equipment; and a proxy session control apparatus connected to the serving session control apparatus and located at an interface with an IP access network. The method comprising the steps of: causing the serving session control apparatus to accept a terminating call to the user equipment; causing the serving session control apparatus to relay terminating call information including an identifier of the user equipment to the proxy session control apparatus in response to acceptance of the terminating call to the user equipment; causing the proxy session control apparatus to execute restoration of a subscriber profile linked with the user equipment based on reception of the terminating call information; and causing the proxy session control apparatus to hold an address of a policy-and-charging apparatus included in a response received from a routing agent along with the execution of the restoration. In the step of causing the proxy session control apparatus to execute restoration, a session between the user equipment and the policy-and-charging apparatus is reestablished based on the held address of the policy-and-charging apparatus, and the user equipment is caused to execute re-registration with the IP multimedia subsystem.

BRIEF DESCRIPTION OF THE DRAWINGS

FIG. 4 is a functional block configuration diagram of a PCRF 240 according to the embodiment of the present invention.

FIG. 5 is a functional block configuration diagram of a PGW 230 according to the embodiment of the present invention.

FIG. 13 is a first diagram showing a communication sequence example (Operation Example 4) concerning the restoration of the subscriber profile of the UE 100 and the re-registration of the UE 100 with the IMS 300 according to the embodiment of the present invention.

FIG. 14 is a second diagram showing the communication sequence example (Operation Example 4) concerning the restoration of the subscriber profile of the UE 100 and the re-registration of the UE 100 with the IMS 300 according to the embodiment of the present invention.

MODE FOR CARRYING OUT THE INVENTION

Next, an embodiment of the present invention will be described. Note that, in the following description of the drawings, same or similar reference signs denote same or similar elements and portions. In addition, it should be noted that the drawings are schematic and ratios of dimensions and the like are different from actual ones.

Therefore, specific dimensions and the like should be determined in consideration of the following description. Moreover, the drawings also include portions having different dimensional relationships and ratios from each other.

Figure 1:
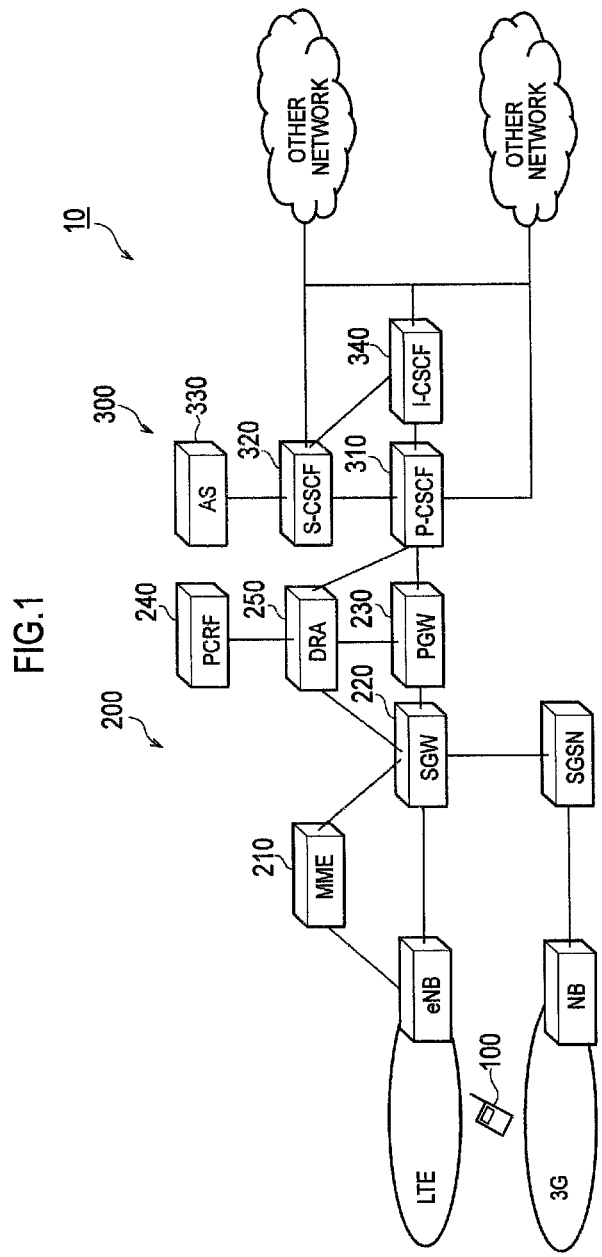
FIG. 1 is an overall schematic configuration diagram of a mobile communication system 10 according to an embodiment of the present invention.

(1) Overall Schematic Configuration of Mobile Communication System Including IP Multimedia Subsystem FIG. 1 is an overall schematic configuration diagram of a mobile communication system 10 according to the embodiment of the present invention. As shown in FIG. 1, the mobile communication system 10 includes user equipment 100 (hereinafter UE 100), an IP-Connectivity Access Network 200 (hereinafter an IP-CAN 200), and an IP Multimedia core network Subsystem 300 (hereinafter an IMS 300).

The UE 100 can establish connection to the IP-CAN 200 via a 3G-mode radio base station (NB) or an LTE-mode radio base station (eNB), and provide a communication service via the IMS 300 (an IP multimedia subsystem).

The IP-CAN 200 is an access network in compliance with the Internet Protocol (IP). Specifically, the IP-CAN 200 is a network that provides a function to transport the Session Initiation Protocol (SIP) and voice media. In this embodiment, the IP-CAN 200 corresponds to an LTE/Evolved Packet Core (EPC) network.

The IP-CAN 200 includes a Mobility Management Entity 210 (hereinafter an MME 210), a Serving Gateway (hereinafter an SGW 220), a Packet Data Network Gateway 230 (hereinafter a PGW 230), a Policy and Charging Rules Function 240 (hereinafter a PCRF 240), and a Diameter Routing Agent 250 (hereinafter a DRA 250).

The MME 210 is switching equipment which accommodates the eNB with a mobility control function, a bearer control function, and the like. The SGW 220 is serving packet switching equipment which accommodates a 3GPP (LTE) access system. The PGW 230 is a packet exchange device which serves as an interface with the IMS platform and performs IP address assignment, packet transfer to the SGW 220, and the like.

Moreover, the PGW 230 executes QoS control, bearer setting control, and the like in conjunction with the PCRF 240. The PCRF 240 executes the Quality of Service (QoS) control for user data transfer and executes charging control. In this embodiment, the PCRF 240 constitutes a policy-and-charging apparatus. The DRA 250 is a routing agent in compliance with the Diameter protocol, which has functions to identify the PCRF 240 accommodating a user when a Diameter signal is transmitted from any of the SGW 220, the PGW 230, and a P-CSCF 310, and then either to forward the Diameter signal to the identified PCRF 240 or to instruct the P-CSCF 310 to forward the Diameter signal to the identified PCRF 240.

The IMS 300 is a multimedia subsystem in compliance with the Internet Protocol and includes a Proxy-Call Session Control Function 310 (hereinafter the P-CSCF 310), a Serving-Call Session Control Function 320 (hereinafter an S-CSCF 320), an Application Server 330 (hereinafter an AS 330), and an Interrogating-Session Control Function 340 (hereinafter an I-CSCF 340). Other networks (such as a fixed-line telephone network) are connected to the IMS 300.

The P-CSCF 310, the S-CSCF 320, and the I-CSCF 340 are SIP relay servers which forward SIP messages and the like. The AS 330 provides applications to be executed by the UE 100.

In particular, the P-CSCF 310 is an SIP relay server located at an interface with the IP-CAN 200 (the EPC), and undertakes roles not only in forwarding the SIP messages but also in starting the QoS control and in grasping a state of an IP-CAN bearer in conjunction with the EPC (the PCRF 240). In this embodiment, the P-CSCF 310 constitutes a proxy session control apparatus. Meanwhile, the S-CSCF 320 executes session control of the UE 100 and user authentication. In this embodiment, the S-CSCF 320 constitutes a serving session control apparatus.

(2) Functional Block Configuration of Mobile Communication System

Next, a functional block configuration of the mobile communication system 10 will be described. To be more precise, functional block configurations of the PGW 230, the PCRF 240, the P-CSCF 310, and the S-CSCF 320 will be described. For the convenience of explanation, the following description will be given in the order of the S-CSCF 320, the P-CSCF 310, the PCRF 240, and the PGW 230.

(2. 1) S-CSCF 320

Figure 2:
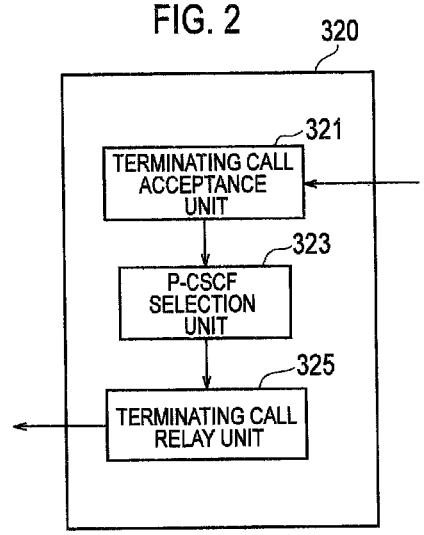
FIG. 2 is a functional block configuration diagram of an S-CSCF 320 according to the embodiment of the present invention.

FIG. 2 is a functional block configuration diagram of the S-CSCF 320. As shown in FIG. 2, the S-CSCF 320 includes a terminating call acceptance unit 321, a P-CSCF selection unit 323, and a terminating call relay unit 325.

The terminating call acceptance unit 321 accepts a terminating call to the UE 100. Specifically, the terminating call acceptance unit 321 receives a terminating call, which is sent from another network (see FIG. 1) to the UE 100, from the I-CSCF 340 as SIP INVITE. An identifier of the UE 100, i.e., an International Mobile Subscriber Identity (IMSI) is included in the SIP INVITE.

In a case such as when the terminating call acceptance unit 321 accepts the terminating call to the UE 100, the P-CSCF selection unit 323 selects a P-CSCF that holds a subscriber profile of the UE 100 (an identifier, subscription information, and the like of the UE 100). Particularly, in this embodiment, if the P-CSCF selection unit 323 detects that the P-CSCF 310 holding the subscriber profile of the UE 100 is not operating normally, the P-CSCF selection unit 323 selects a P-CSCF 310 different from the P-CSCF 310 holding the subscriber profile of the UE 100.

Figure 3:
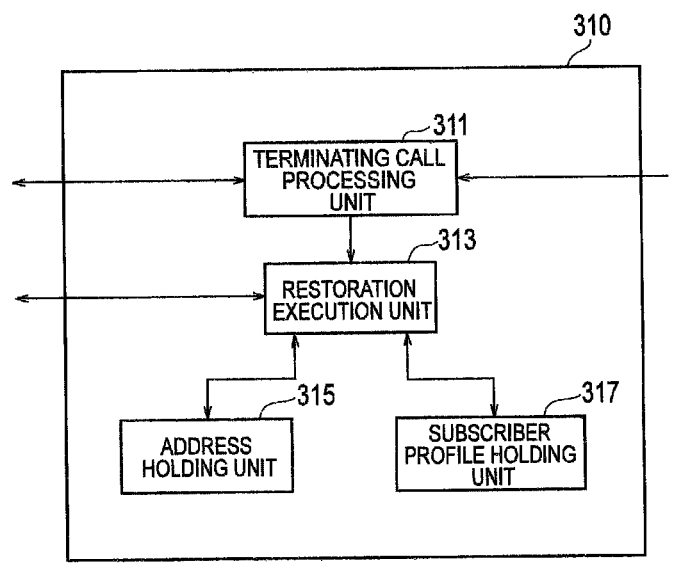
FIG. 3 is a functional block configuration diagram of a P-CSCF 310 according to the embodiment of the present invention.

Meanwhile, when the terminating call to the UE 100 is rejected by the P-CSCF 310 (specifically, a terminating call processing unit 311 shown in FIG. 3) or when the terminating call encounters a timeout without any response, the P-CSCF selection unit 323 can select a P-CSCF 310 different from the P-CSCF 310 holding the subscriber profile of the UE 100.

The terminating call relay unit 325 relays the terminating call to the UE 100, which is received from the I-CSCF 340, to the P-CSCF 310. Specifically, in response to acceptance of the terminating call to the UE 100 by the terminating call acceptance unit 321, the terminating call relay unit 325 relays the SIP INVITE (terminating call information) including the identifier (the IMSI) of the UE 100 to the P-CSCF 310.

In the meantime, if the P-CSCF selection unit 323 selects a P-CSCF 310 different from the P-CSCF 310 holding the subscriber profile of the UE 100, the terminating call relay unit 325 relays the SIP INVITE to the different P-CSCF 310.

(2. 2) P-CSCF 310

FIG. 3 is a functional block configuration diagram of the P-CSCF 310. As shown in FIG. 3, the P-CSCF 310 includes the terminating call processing unit 311, a restoration execution unit 313, an address holding unit 315, and a subscriber profile holding unit 317.

The terminating call processing unit 311 receives the SIP INVITE relayed from the S-CSCF 320. Specifically, based on the received SIP INVITE, the terminating call processing unit 311 executes terminating call processing in accordance with the SIP protocol in conjunction with the UE 100. Meanwhile, the terminating call processing unit 311 can also suspend the SIP INVITE relayed from the S-CSCF 320 and process the terminating call to the UE 100 after the restoration execution unit 313 completes restoration of the subscriber profile of the UE 100. Moreover, the terminating call processing unit 311 can also reject the terminating call to the UE 100 based on the SIP INVITE relayed from the S-CSCF 320 in the case of a failure of a transmission line between the P-CSCF 310 and the PCRF 240.

The restoration execution unit 313 executes the restoration of the subscriber profile linked with the UE 100. Specifically, the restoration execution unit 313 determines the presence or absence of the subscriber profile of the UE 100 based on the reception of the SIP INVITE by the terminating call processing unit 311, i.e., at the time of reception of the SIP INVITE. Then, the restoration execution unit 313 executes the restoration of the subscriber profile linked with the UE 100.

To be more precise, based on a user ID (the identifier of the UE 100) included in the SIP INVITE, the restoration execution unit 313 determines whether or not the subscriber profile linked with the UE 100 is held. The user ID corresponds to any of a Public User ID, a Private User ID, the IMSI, and the like. The restoration execution unit 313 can determine a case where the subscriber profile linked with the UE 100 is not held at all or a case where the subscriber profile linked with the UE 100 is held but part of the subscriber profile is missing. The restoration execution unit 313 executes the restoration of the subscriber profile when the subscriber profile is not held or when the subscriber profile is missing.

Meanwhile, the restoration execution unit 313 can also execute the restoration in the state where the terminating call processing unit 311 suspends the terminating call to the UE 100, i.e., in the state where the SIP INVITE is suspended.

When the restoration execution unit 313 executes the restoration of the subscriber profile, the restoration execution unit 313 reestablishes a session between the UE 100 and the PCRF 240 based on an address of the PCRF 240 held by the address holding unit 315, thereby causing the UE 100 to perform re-registration with the IMS 300. Here, the restoration execution unit 313 holds the address of the PCRF 240 included in Diameter-AA Answer, which is a response to Diameter AA-Request to be transmitted to the DRA 250.

Note that the Diameter AA Request and AA answer may be separate new Diameter signals.

The address holding unit 315 holds the address of the PCRF 240 linked with the UE 100. Specifically, the address holding unit 315 holds the address of the PCRF 240 which is included either in the Diameter-AA Answer response or in a new Diameter response signal received from the DRA 250 along with the execution of the restoration by the restoration execution unit 313.

The subscriber profile holding unit 317 holds the subscriber profile which is linked with the UE 100 having executed the registration with the IMS 300. When the registration of the UE 100 with the IMS 300 is cancelled, the subscriber profile holding unit 317 deletes the subscriber profile.

(2. 3) PCRF 240

FIG. 4 is a block configuration diagram of the PCRF 240. As shown in FIG. 4, the PCRF 240 includes a restoration request processing unit 241, an address holding unit 243, and an address notification unit 245.

The restoration request processing unit 241 receives a restoration request for the subscriber profile transmitted from the P-CSCF 310, namely, Diameter Session Termination Request. The Diameter Session Termination Request includes: a flag indicating the restoration request for the subscriber profile of the UE 100; and an address of the P-CSCF 310.

Here, the Diameter Session Termination Request and Diameter Session Termination Answer, which is a response to the Diameter Session Termination Request, may be separate new Diameter signals.

The address holding unit 243 holds the address of the P-CSCF 310 which is included either in the Diameter Session Termination Request or in a separate Diameter signal.

The address notification unit 245 notifies the PGW 230 of the address of the P-CSCF 310 held by the address holding unit 243. Specifically, in an attachment procedure executed with the UE 100, the address notification unit 245 sets the address of the P-CSCF 310 to Protocol Configuration Options (PCO), and notifies the PGW 230 of information in which the PCO are set.

(2. 4) PGW 230

FIG. 5 is a functional block configuration diagram of the PGW 230. As shown in FIG. 5, the PGW 230 includes a restoration request processing unit 231, an address holding unit 233, and an address notification unit 235. The PGW 230 has substantially the same functions as those of the PCRF 240 described above.

The restoration request processing unit 231 executes a PDN release procedure and an attachment procedure in conjunction with the PCRF 240 based on the restoration request for the subscriber profile transmitted from the P-CSCF 310 to the PCRF 240.

The address holding unit 233 holds the address of the P-CSCF 310 which is transmitted to the PGW 230 in the PDN release procedure.

The address notification unit 235 notifies the SGW 220 of the address of the P-CSCF 310 held by the address holding unit 233. Specifically, in the attachment procedure executed with the UE 100, the address notification unit 235 sets the address of the P-CSCF 310 to the Protocol Configuration Options (PCO), and notifies the SGW 220 of information in which the PCO are set.

(3) Operations of Mobile Communication System

Next, operations of the mobile communication system 10 will be described. To be more precise, operations to execute the restoration of the subscriber profile of the UE 100 held by the P-CSCF 310 on the occasion of the terminating call to the UE 100, and to cause the UE 100 to execute the re-registration with the IMS 300 will be described.

(3. 1) Operation Example 1

Figure 6:
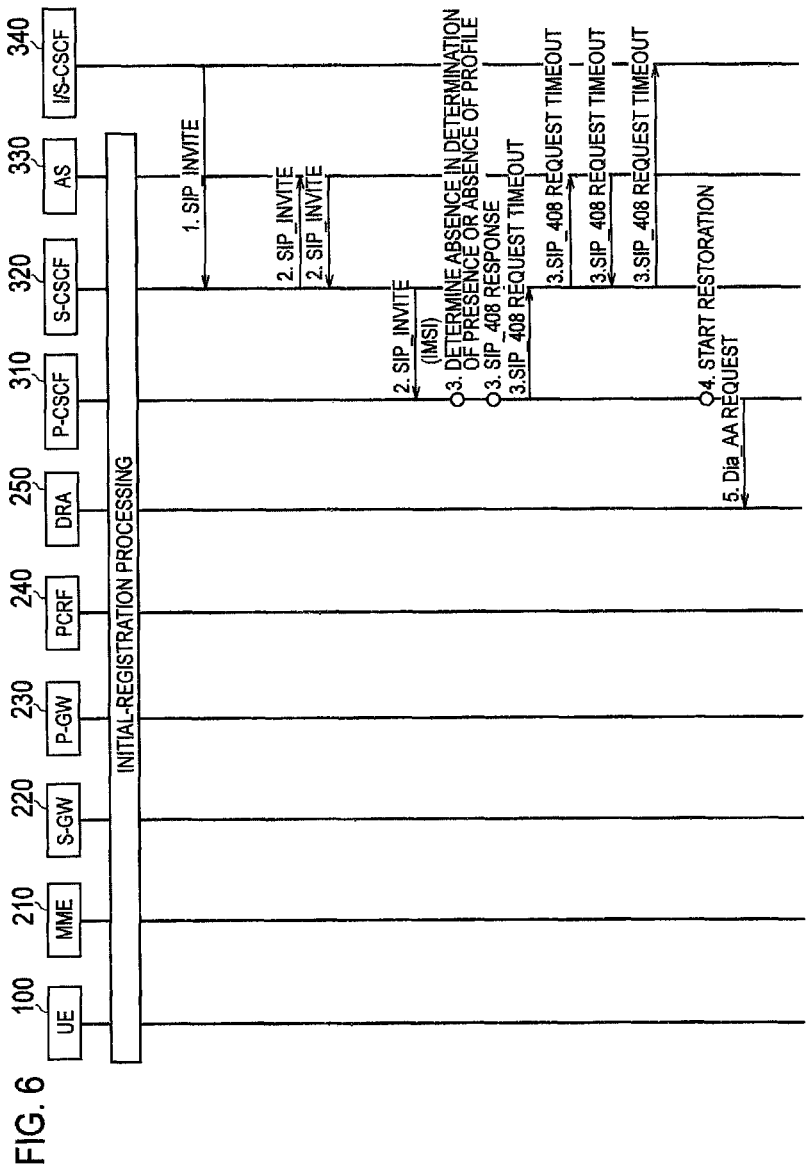
FIG. 6 is a first diagram showing a communication sequence example (Operation Example 1) concerning restoration of a subscriber profile of UE 100 and re-registration of the UE 100 with an IMS 300 according to the embodiment of the present invention.
Figure 7:
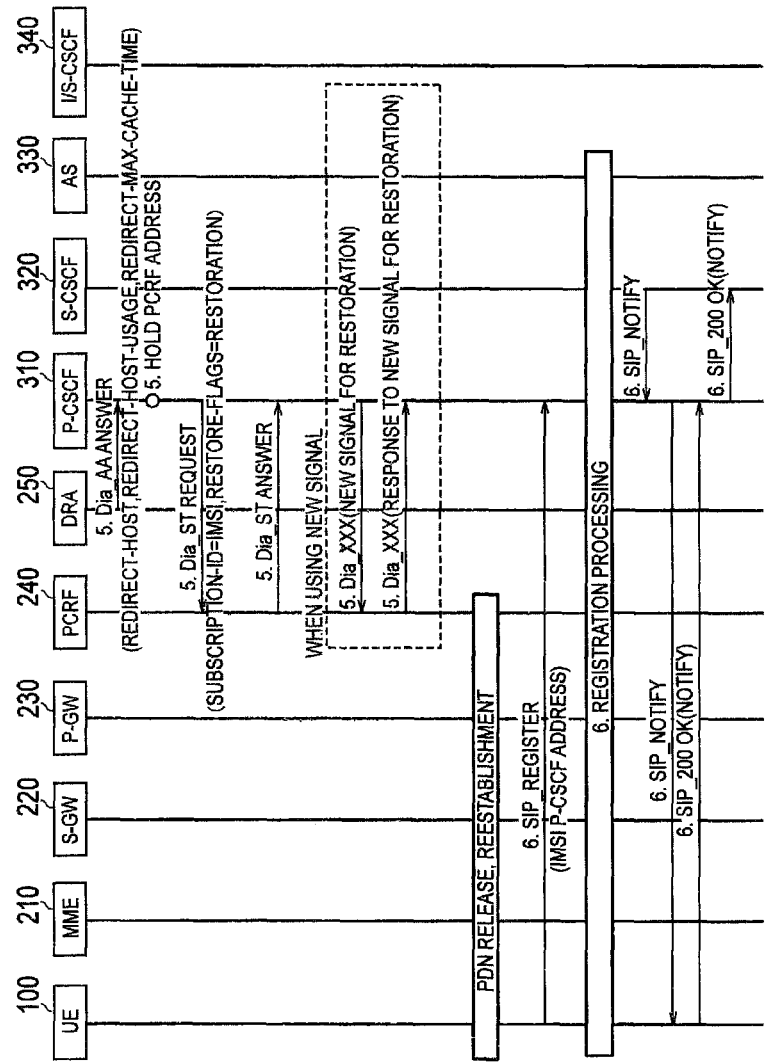
FIG. 7 is a second diagram showing the communication sequence example (Operation Example 1) concerning the restoration of the subscriber profile of the UE 100 and the re-registration of the UE 100 with the IMS 300 according to the embodiment of the present invention.

FIG. 6 and FIG. 7 show a communication sequence example (Operation Example 1) concerning the restoration of the subscriber profile of the UE 100 and the re-registration of the UE 100 with the IMS 300. As shown in FIG. 6, the I-CSCF 340 (or the S-CSCF) receives a terminating call to the UE 100 from another network (see FIG. 1), and transmits the SIP INVITE to the S-CSCF 320 in response to the terminating call (step 1). Here, registration (initial-Registration) of the UE 100 with the IMS 300 is assumed to have already been completed.

The S-CSCF 320 performs transmission and reception of the SIP INVITE with the AS 330 and the P-CSCF 310 (step 2). Here, the SIP INVITE transmitted from the S-CSCF 320 to the P-CSCF 310 includes the user ID of the UE 100, namely, a Public User Identity, a Private User Identity or the like. Here, the Private User Identity may be the IMSI, or information such as a URN which can identify the user.

Based on the SIP INVITE received from the S-CSCF 320, the P-CSCF 310 determines the presence or absence of the subscriber profile linked with the UE 100, i.e., whether or not the subscriber profile is held normally without any part missing.

Here, the subscriber profile is assumed to be not held or be partially missing. The P-CSCF 310 sends the S-CSCF 320 a response (such as SIP_408 Request timeout or other SIP error responses; the same shall apply hereinafter) to the received SIP INVITE (step 3). In addition, the S-CSCF 320 performs transmission and reception of the SIP_408 Request timeout with the AS 330 and the I-CSCF 340. As a consequence, the terminating call to the UE 100 is once rejected and results in a call loss.

In response to the transmission of the SIP_408 Request timeout, the P-CSCF 310 decides to start the restoration of the subscriber profile, and transmits the Diameter AA-Request (Dia_AA Request in FIG. 6) to the DRA 250 (step 4).

As shown in FIG. 7, the DRA 250 sends the P-CSCF 310 the Diameter-AA Answer in response to the received Diameter AA-Request (step 5). The Diameter-AA Answer (Dia_AA Answer in FIG. 7) includes Redirect-Host, Redirect-Host-Usage, and Redirect-Max-Cache-Time as parameters. Based on the Redirect-Host information included in the Diameter-AA Answer, the P-CSCF 310 holds the address of the PCRF 240 linked with the UE 100.

Furthermore, the P-CSCF 310 transmits the Diameter Session Termination Request (Dia_ST Request in FIG. 7) to the PCRF 240 based on the address of the PCRF 240 held by the P-CSCF 310. The Diameter Session Termination Request includes contents indicating Subscription-ID=IMSI, and Restore-Flags=Restoration. The PCRF 240 sends the P-CSCF 310 Diameter Session Termination Answer (Dia_ST Answer in FIG. 7), which is a response to the Diameter Session Termination Request.

Here, as shown in FIG. 7, new Diameter signals (Diameter_XXX (new signal for restoration) and Dia_XXX (response to new signal for restoration)) may be used instead of the Diameter Session Termination Request and the Diameter Session Termination Answer, respectively. Meanwhile, the identifier of the UE 100 included in the Diameter Session Termination Request may be a Mobile Station Integrated Services Digital Network (MISISDN) code instead of the IMSI.

In the meantime, the above-mentioned Operation Example 1 describes the operation of the DRA 250 serving as the Diameter Redirect Agent. However, when the DRA 250 is operated in a Relay or Proxy mode, the Diameter signal may be forwarded directly to the P-CSCF 310 instead of being sent as the response to the P-CSCF 310.

The PCRF 240 executes the PDN release procedure based on the received Diameter Session Termination Request. Based on IR.92 specifications, when the UE 100 detects the execution of the PDN release, the UE 100 executes a PDN reestablishment procedure for re-setting a communication bearer (step 6). Moreover, after the completion of the PDN release procedure and the PDN reestablishment procedure, the UE 100 executes registration processing (re-registration) in conjunction with the IP-CAN 200 and a system constituting the IMS 300, thereby reestablishing a session between the UE 100 and the PCRF 240. Here, the contents of the PDN release procedure, the PDN reestablishment procedure, and the registration processing are similar to the contents previously specified by 3GPP.

(3. 2) Operation Example 2

Figure 8:
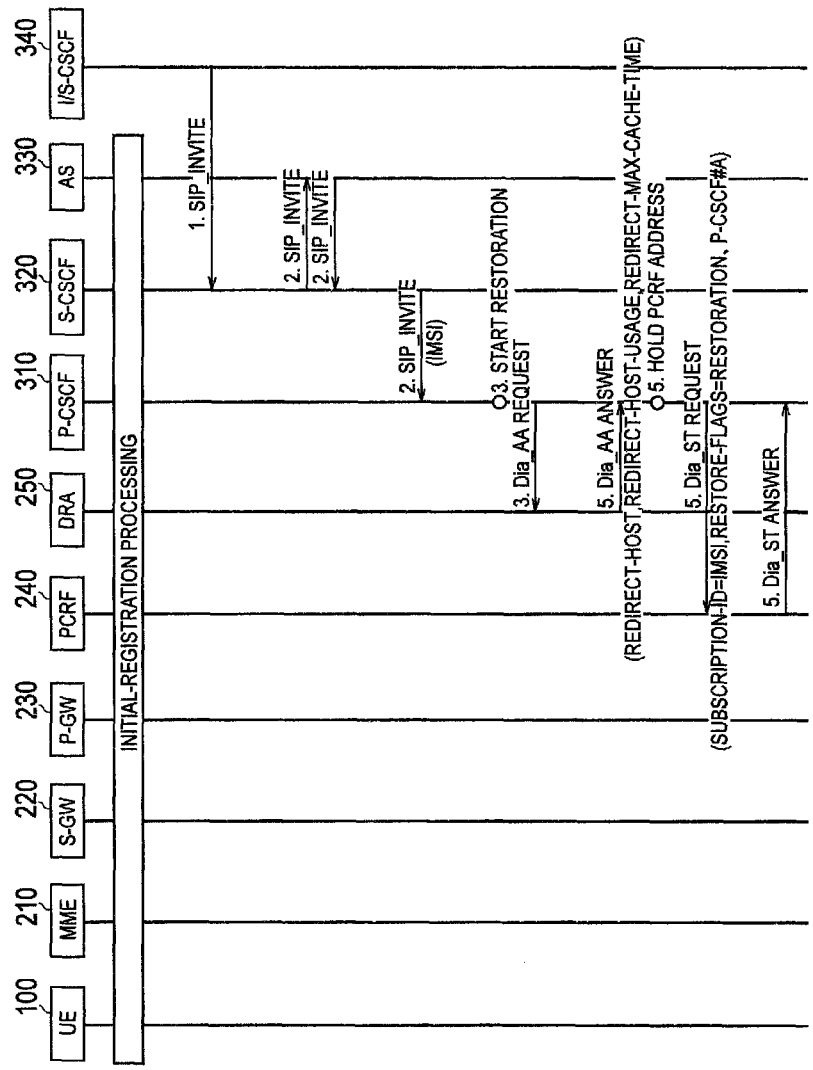
FIG. 8 is a first diagram showing a communication sequence example (Operation Example 2) concerning the restoration of the subscriber profile of the UE 100 and the re-registration of the UE 100 with the IMS 300 according to the embodiment of the present invention.
Figure 9:
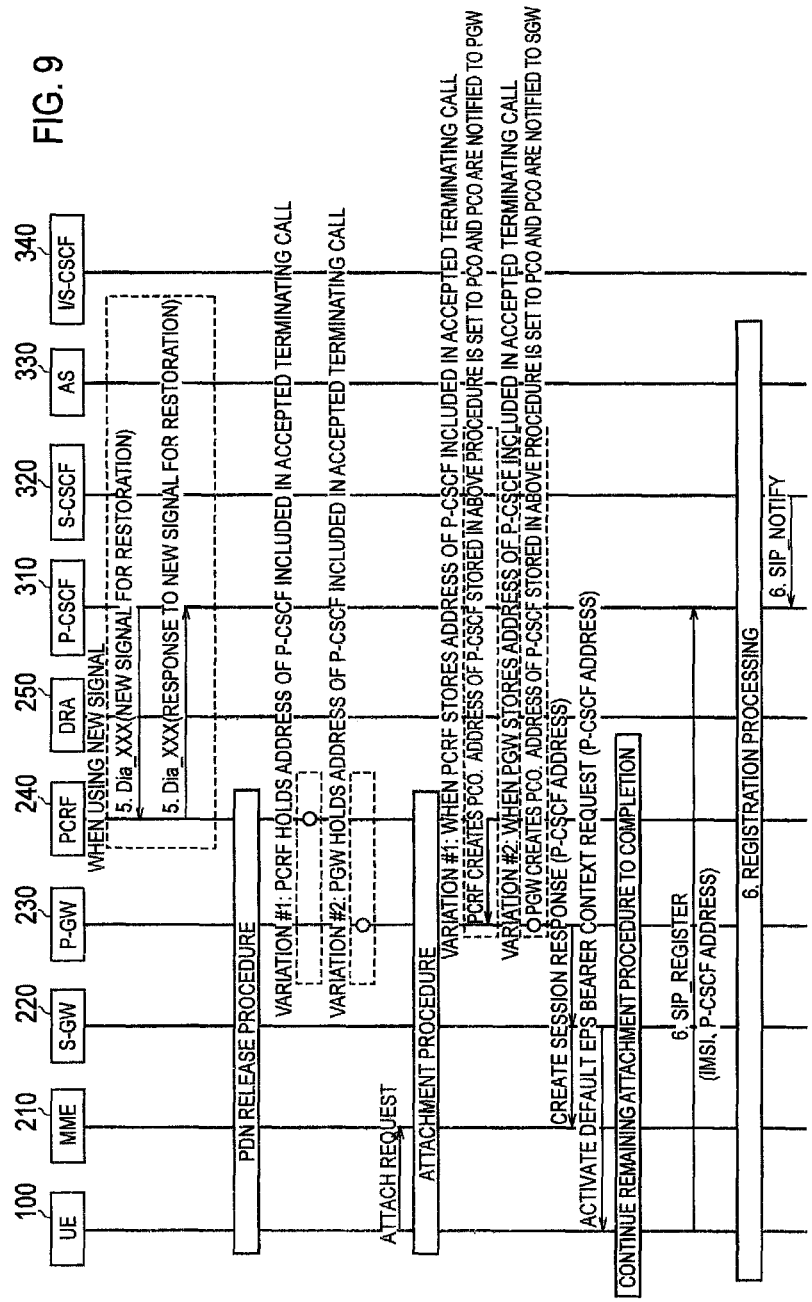
FIG. 9 is a second diagram showing the communication sequence example (Operation Example 2) concerning the restoration of the subscriber profile of the UE 100 and the re-registration of the UE 100 with the IMS 300 according to the embodiment of the present invention.
Figure 10:
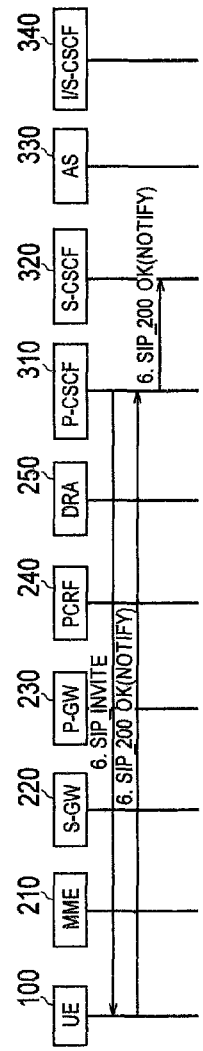
FIG. 10 is a third diagram showing the communication sequence example (Operation Example 2) concerning the restoration of the subscriber profile of the UE 100 and the re-registration of the UE 100 with the IMS 300 according to the embodiment of the present invention.

FIG. 8 to FIG. 10 show a communication sequence example (Operation Example 2) concerning the restoration of the subscriber profile of the UE 100 and the re-registration of the UE 100 with the IMS 300. Operation Example 2 is a modified example of Operation Example 1 described above, and is designed to execute the restoration of the subscriber profile of the UE 100 and the re-registration of the UE 100 with the IMS 300 while suspending the terminating call to the UE 100 without rejecting the terminating call. In the following, features different from those in Operation Example 1 will be mainly described.

As shown in FIG. 8, when the P-CSCF 310 receives the SIP INVITE from the S-CSCF 320, the P-CSCF 310 suspends processing without sending an error response to the SIP INVITE, and starts the restoration of the subscriber profile of the UE 100 (step 3). Meanwhile, as shown in FIG. 9, the PCRF 240 holds the address of the P-CSCF 310 included in the Diameter Session Termination Request (variation #1). Alternatively, the PGW 230 holds the address of the P-CSCF 310 which is transmitted to the PGW 230 in the PDN release procedure executed with the UE 100 (variation #2).

Moreover, in the attachment procedure (re-attachment) executed with the UE 100, the PCRF 240 sets the address of the P-CSCF 310 to the Protocol Configuration Options (PCO) and notifies the PGW 230 of information in which the PCO are set (variation #1). Alternatively, in the attachment procedure, the PGW 230 sets the address of the P-CSCF 310 to the Protocol Configuration Options (PCO), and notifies the SGW 220 of the information in which the PCO are set (variation #2).

Thereafter, the PGW 230 and the SGW 220 transmit a Create Session Response (PCO: P-CSCF address), and the MME 210 sends the UE 100 Activate Default EPS Bearer Context Request (PCO: P-CSCF address).

The UE 100 continues the attachment procedure based on the received Activate Default EPS Bearer Context Request. After the completion of the attachment procedure, the UE 100 executes the registration processing (the re-registration) in conjunction with the IP-CAN 200 and the system constituting the IMS 300. In the meantime, as shown in FIG. 9 and FIG. 10, the P-CSCF 310 starts the processing of the suspended terminating call to the UE 100 upon completion of the re-registration.

(3. 3) Operation Example 3

Figure 11:
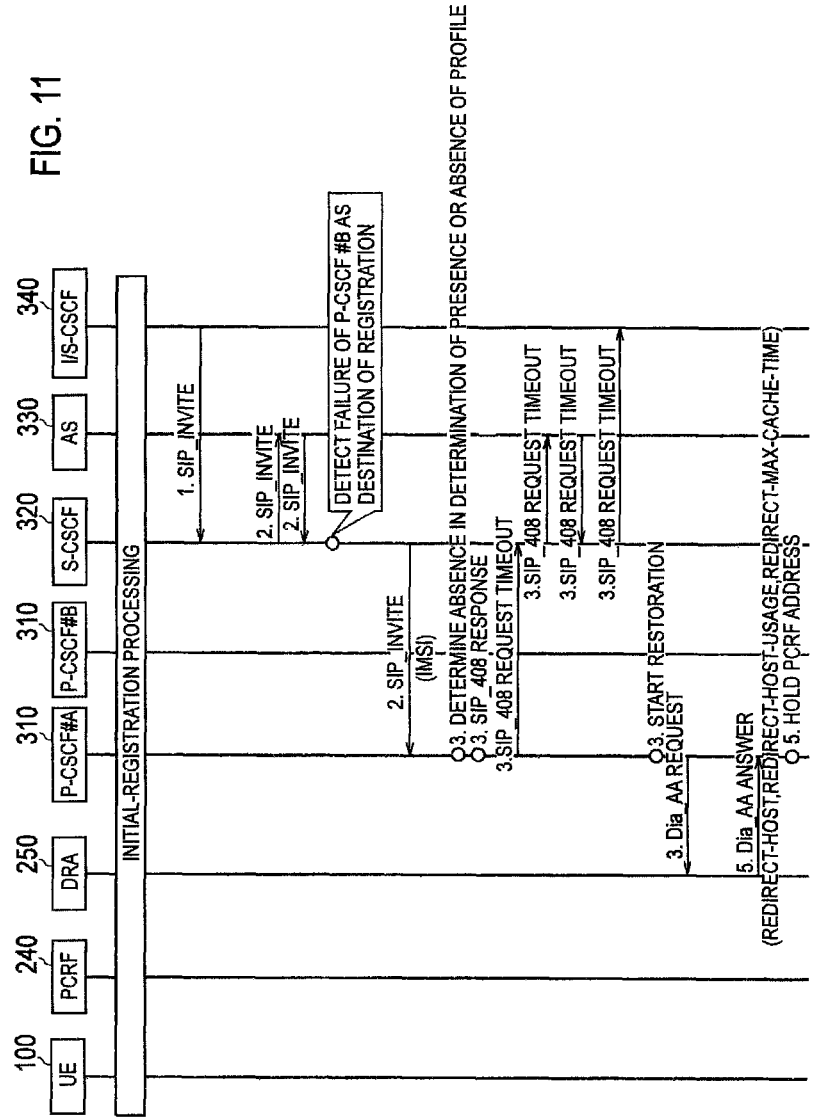
FIG. 11 is a first diagram showing a communication sequence example (Operation Example 3) concerning the restoration of the subscriber profile of the UE 100 and the re-registration of the UE 100 with the IMS 300 according to the embodiment of the present invention.
Figure 12:
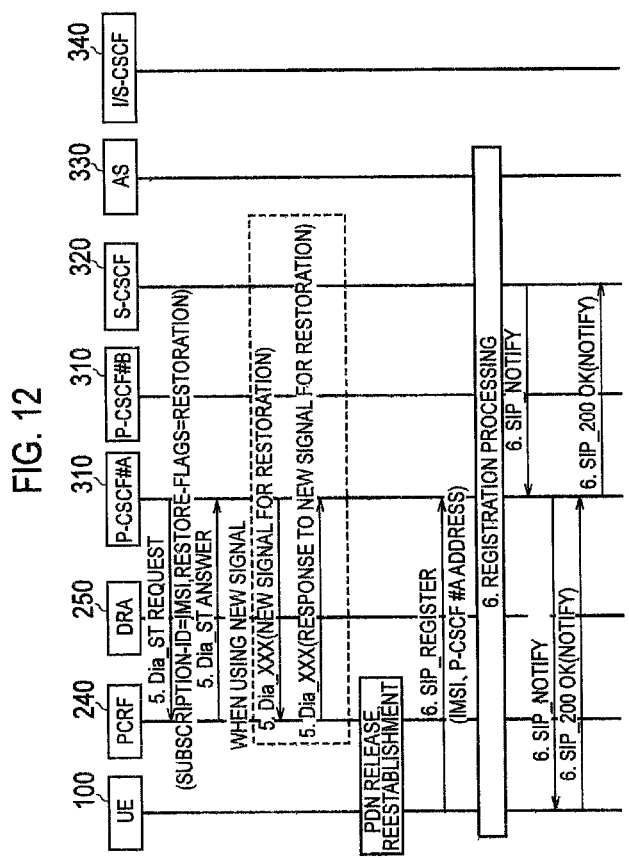
FIG. 12 is a second diagram showing the communication sequence example (Operation Example 3) concerning the restoration of the subscriber profile of the UE 100 and the re-registration of the UE 100 with the IMS 300 according to the embodiment of the present invention.

FIG. 11 and FIG. 12 show a communication sequence example (Operation Example 3) concerning the restoration of the subscriber profile of the UE 100 and the re-registration of the UE 100 with the IMS 300. This operation example assumes a case where the P-CSCF with which the UE 100 is registered, i.e., the P-CSCF 310 (indicated as P-CSCF #B in this case) holding the subscriber profile of the UE 100 is completely shut down due to a failure. For this reason, the P-CSCF 310 (indicated as P-CSCF #A) different from the P-CSCF #B is selected.

As shown in FIG. 11, when the S-CSCF 320 receives the SIP INVITE from the I-CSCF 340 (or the S-CSCF), the S-CSCF 320 determines whether or not the P-CSCF #B with which the UE 100 is registered is operating normally (step 2). Specifically, the S-CSCF 320 executes a health check of the P-CSCF #B by periodically transmitting an SIP OPTION or a certain Heartbeat/Keepalive signal between the P-CSCF #B and the S-CSCF 320, thereby detecting that the P-CSCF #B is not operating normally, i.e., that a failure occurs in the P-CSCF #B. Alternatively, the S-CSCF 320 detects that a failure occurs in the P-CSCF #B based on a fact that a response to the SIP INVITE transmitted to the P-CSCF #B ends in a timeout. In the meantime, the S-CSCF 320 may detect that the P-CSCF #B is not operating normally (for example, due to regular inspection, emergency maintenance work, and the like of the P-CSCF #B) based on information notified from another apparatus (such as an OPS).

When the S-CSCF 320 detects that a failure occurs in the P-CSCF #B, the S-CSCF 320 selects the P-CSCF different from the P-CSCF #B, namely, the P-CSCF #A in this case. Here, when the S-CSCF 320 selects a specific P-CSCF among other numerous P-CSCFs, the S-CSCF 320 can select the specific P-CSCF in accordance with a round robin method, for example. Of course, the S-CSCF 320 may select the specific P-CSCF in accordance with a method other than the round robin method.

The operation from step 3 on is substantially the same as that in Operation Example 1 explained above, and description thereof will be omitted herein.

(3. 4) Operation Example 4

FIG. 13 and FIG. 14 show a communication sequence example (Operation Example 4) concerning the restoration of the subscriber profile of the UE 100 and the re-registration of the UE 100 with the IMS 300. This operation example assumes a case where a transmission line between the P-CSCF #A, with which the UE 100 is registered, and the PCRF 240 is disconnected (Stream Control Transmission Protocol (SCTP) disconnected) due to a failure.

As shown in FIG. 13, the S-CSCF 320 relays the SIP INVITE to the P-CSCF #A (step 2). When priority call control is activated in order to give priority to a specific terminating call, the P-CSCF #A detects that it is not possible to transmit a Diameter signal to the PCRF 240 since the P-CSCF #A has detected that the transmission line between P-CSCF #A and the PCRF 240 was disconnected due to the failure (step 3). Based on the detection that it is not possible to transmit the Diameter signal, the P-CSCF #A notifies the S-CSCF 320 of an error regarding the SIP INVITE. As a consequence, the terminating call to the UE 100 is rejected and results in a call loss.

Specifically, the P-CSCF #A notifies the S-CSCF 320 of SIP_503 (Reason: Q.850; cause=41; PCRF failure) as an error response to the SIP INVITE. The SIP_503 includes an information element indicating that the error is attributed to the failure of the PCRF 240 (to be more precise, the failure of the transmission line between the P-CSCF #A and the PCRF 240).

On the other hand, as shown in FIG. 14, when the priority call control is not activated, the P-CSCF #A notifies the S-CSCF 320 of the SIP_503 (Reason: Q.850; cause=41; PCRF failure) as the error response to the SIP INVITE in the processing of the terminating call in conjunction with the UE 100 (steps 4 to 6).

The S-CSCF 320 selects the P-CSCF 310 (the P-CSCF #B) different from the P-CSCF #A based on the SIP_503 received from the P-CSCF #A (step 7). The method of selecting the P-CSCF 310 different from the P-CSCF #A is the same as that in Operation Example 3 described above.

Meanwhile, the procedure to execute the restoration of the subscriber profile of the UE 100 by the P-CSCF #B is the same as the operation from step 4 on in Operation Example 1 described above.

(3. 5) Operation when Executing Re-Registration

When the UE 100 executes the re-registration with the IMS 300 in accordance with the above-described operation examples, it is preferable to identify the S-CSCF 320 and the AS 330 before the re-registration and to process the terminating call to the UE 100 by using the S-CSCF 320 and the AS 330 thus identified.

When the P-CSCF 310 receives a request for the re-registration from the UE 100, the P-CSCF 310 can identify the S-CSCF 320 that has previously registered the UE 100, by making an inquiry at a home subscriber server (HSS).

In the meantime, if the S-CSCF 320 receives a request for the re-registration from the UE 100 by way of the P-CSCF 310 via the I-CSCF, then it is necessary to identify the AS 330 that has been used before the re-registration. In this case, the S-CSCF 320 may include a subscriber profile holding unit similar to that in the P-CSCF 310, and identify the AS 330 that has been used by the UE 100 before the re-registration based on the subscriber profile of the UE 100 held by the subscriber profile holding unit.

(4) Operation and Effects

According to the above-described mobile communication system 10, the P-CSCF 310 executes the restoration of the subscriber profile linked with the UE 100 based on the reception of the SIP INVITE (the terminating call information) including the IMSI of the UE 100. Moreover, the P-CSCF 310 reestablishes the session between the UE 100 and the PCRF 240 based on the address of the PCRF 240 held by the P-CSCF 310, thereby causing the UE 100 to perform the re-registration with the IMS 300.

In other words, normality of the subscriber profile linked with the UE 100 is judged in response to the terminating call to the UE 100, and a necessity of the restoration of the subscriber profile is determined based on a result of the judgment. For this reason, it is possible to execute timely restoration of only the necessary subscriber profile when part of the subscriber profile held by the P-CSCF 310 is missing, for instance. In the meantime, the restoration of only the subscriber profile concerning the UE 100 is executed at the timing of the terminating call to the UE 100. Accordingly, it is also possible to avoid a situation where a load on the network becomes higher due to temporary increase in control signals transmitted and received along with the re-registration of a large number of UEs.

Furthermore, the procedures (the PDN release and reestablishment procedures and the attachment procedure) to reestablish the session between the UE 100 and the PCRF 240 are executed in association with the restoration of the subscriber profile. Accordingly, this configuration is also applicable to UE compatible with Release 8 or earlier, which does not comply with the method of prompting the UE to perform the re-registration via the network.

That is to say, the mobile communication system 10 can cause the UE 100 to execute the re-registration depending on an operating condition of the P-CSCF 310 irrespective of a release version that the UE 100 is compatible with.

In this embodiment, as shown in Operation Example 2 described above, the restoration of the subscriber profile can be executed while suspending the terminating call to the UE 100. Accordingly, it is possible to execute the restoration of the subscriber profile without bringing the terminating call into a call loss, and without sacrificing user convenience.

In this embodiment, if the P-CSCF 310 holding the subscriber profile is detected as not operating normally, then the P-CSCF 310 different from the above-mentioned P-CSCF 310 is selected. Accordingly, even when the P-CSCF 310 holding the subscriber profile cannot resume the operation or when the failure continues for a long period, it is still possible to promptly execute the restoration of the subscriber profile.

Meanwhile, if there is the failure of the transmission line between the P-CSCF 310 and the PCRF 240, the different P-CSCF 310 is selected in this embodiment. Accordingly, it is possible to promptly execute the restoration of the subscriber profiled even in the case of the failure of the transmission line.

(5) Other Embodiments

As described above, the details of the present invention have been disclosed by using the embodiment of the present invention. However, it should not be understood that the description and drawings which constitute part of this disclosure limit the present invention. From this disclosure, various alternative embodiments will be easily found by those skilled in the art.

For instance, in the above-mentioned embodiment (the operation examples), the terminating call using the SIP INVITE is explained as the example. However, instead of the SIP INVITE, reception of an SIP signal transmitted to receiving-side UE 100, such as MESSAGE, REFER, and OPTION may trigger the execution of the operations shown in Operation Examples 1 to 4.

Meanwhile, in the above-mentioned embodiment, if the P-CSCF 310 holding the subscriber profile is detected as not operating normally, then the P-CSCF 310 different from the above-mentioned P-CSCF 310 is selected. However, this function is not always necessary. For instance, instead of selecting the different P-CSCF 310, the restoration by the P-CSCF 310 holding the subscriber profile may be attempted several times.

In the meantime, in the above-mentioned embodiment, the restoration of the subscriber profile and the re-registration of the UE 100 are achieved by the P-CSCF 310 and the S-CSCF 320. However, the functions of the P-CSCF 310 or the S-CSCF 320 may be incorporated in the IP-CAN 200 or another system constituting the IMS 300.

In the above-mentioned embodiment, the description is given on the premise of a voice terminating call. However, such a terminating call may be replaced by all services which can be provided on the IMS including, for example, RCS, RCS-e, SMS, USSD, instant messaging, positional information, terminal capability exchange, image sharing, and video sharing.

In the above-mentioned embodiment, the IP-CAN is based on the LTE. However, the network can be replaced by other access networks capable of providing the IMS including, for example, GERAN, UTRAN, GPRS, WiFi, X.25 or the fixed Internet network.

Here, the above-mentioned present invention may be described as follows. In summary, a first feature of the present invention provides an IMS 300 (an IP multimedia subsystem) including: an S-CSCF 320 (a serving session control apparatus) configured to execute session control of UE 100 (user equipment); and a P-CSCF 310 (a proxy session control apparatus) connected to the serving session control apparatus and located at an interface with an IP access network. The serving session control apparatus includes: a terminating call acceptance unit 321 (a terminating call acceptance unit) configured to accept a terminating call to the user equipment; and a terminating call relay unit 325 (a terminating call relay unit) configured to relay an SIP INVITE (terminating call information) including an identifier (for example, an IMSI) of the user equipment to the proxy session control apparatus in response to acceptance of the terminating call to the user equipment by the terminating call acceptance unit. The proxy session control apparatus includes: a terminating call processing unit 311 (a terminating call processing unit) configured to receive the terminating call information from the serving session control apparatus; a restoration execution unit 313 (a restoration execution unit) configured to execute restoration of a subscriber profile linked with the user equipment based on reception of the terminating call information by the terminating call processing unit; and an address holding unit 315 (an address holding unit) configured to hold an address of a PCRF 240 (a policy-and-charging apparatus) included in a response received from a routing agent along with the execution of the restoration by the restoration execution unit. The restoration execution unit reestablishes a session between the user equipment and the policy-and-charging apparatus based on the address of the policy-and-charging apparatus held by the address holding unit, and causes the user equipment to execute re-registration with the IP multimedia subsystem.

In the first feature of the present invention, based on the identifier included in the terminating call information, the restoration executing unit may determine whether or not the subscriber profile linked with the user equipment is held, and the restoration executing unit may execute the restoration when the subscriber profile is not held or when the subscriber profile is missing.

In the first feature of the present invention, the restoration execution unit may execute the restoration in a state where the terminating call processing unit suspends the terminating call to the user equipment, and after the restoration is completed, the terminating call processing unit may process the terminating call to the user equipment.

In the first feature of the present invention, the serving session control apparatus may include a P-CSCF selection unit 323 (an apparatus selection unit) configured, when the serving session control apparatus detects that the proxy session control apparatus holding the subscriber profile is not operating normally, to select a proxy session control apparatus different from the proxy session control apparatus, and the terminating call relay unit may relay the terminating call information to the different proxy session control apparatus.

In the first feature of the present invention, the terminating call processing unit may reject the terminating call to the user equipment when there is a failure of a transmission line between the proxy session control apparatus and the policy-and-charging apparatus, and the serving session control apparatus may include a P-CSCF selection unit 323 (an apparatus selection unit) configured, when the terminating call to the user equipment is rejected by the terminating call processing unit, to select a proxy session control apparatus different from the proxy session control apparatus.

In summary, a second feature of the present invention provides a proxy session control apparatus constituting an IP multimedia subsystem and located at an interface with an IP access network, including: a terminating call processing unit configured to receive terminating call information from a serving session control apparatus configured to execute session control of user equipment, the terminating call information including an identifier of the user equipment and being relayed in response to acceptance of a terminating call to the user equipment; a restoration execution unit configured to execute restoration of a subscriber profile linked with the user equipment based on reception of the terminating call information by the terminating call processing unit; and an address holding unit configured to hold an address of a policy-and-charging apparatus included in a response received from a routing agent along with the execution of the restoration by the restoration execution unit. The restoration execution unit reestablishes a session between the user equipment and the policy-and-charging apparatus based on the address of the policy-and-charging apparatus held by the address holding unit, and causes the user equipment to execute re-registration with the IP multimedia subsystem.

In summary, a third feature of the present invention provides a communication control method implemented by an IP multimedia subsystem provided with: a serving session control apparatus configured to execute session control of user equipment; and a proxy session control apparatus connected to the serving session control apparatus and located at an interface with an IP access network. The method including the steps of: causing the serving session control apparatus to accept a terminating call to the user equipment; causing the serving session control apparatus to relay terminating call information including an identifier of the user equipment to the proxy session control apparatus in response to acceptance of the terminating call to the user equipment; causing the proxy session control apparatus to execute restoration of a subscriber profile linked with the user equipment based on reception of the terminating call information; and causing the proxy session control apparatus to hold an address of a policy-and-charging apparatus included in a response received from a routing agent along with the execution of the restoration. In the step of causing the proxy session control apparatus to execute restoration, a session between the user equipment and the policy-and-charging apparatus is reestablished based on the held address of the policy-and-charging apparatus, and the user equipment is caused to execute re-registration with the IP multimedia subsystem. As described above, the present invention naturally includes various embodiments which are not described herein. Accordingly, the technical scope of the present invention should be determined only by the matters to define the invention in the scope of claims regarded as appropriate based on the description.

Note that the entire content of Japanese Patent Application No. 2013-197532 (filed on Sep. 24, 2013) is incorporated herein by reference in the present specification.

INDUSTRIAL APPLICABILITY

According to the features of the present invention, it is possible to provide an IP multimedia subsystem, a proxy session control apparatus, and a communication control method, which are capable of causing user equipment to execute re-registration depending on an operating condition of a proxy session control apparatus (P-CSCF) irrespective of a release version that the user equipment is compatible with.

EXPLANATION OF THE REFERENCE NUMERALS

10 mobile communication system
100 UE
200 IP-CAN
210 MME
220 SGW
230 PGW
231 restoration request processing unit
233 address holding unit
235 address notification unit
240 PCRF
241 restoration request processing unit
243 address holding unit
245 address notification unit
250 DRA
300 IMS
310 P-CSCF
311 terminating call processing unit
313 restoration execution unit
315 address holding unit
317 subscriber profile holding unit
320 S-CSCF
321 terminating call acceptance unit
323 P-CSCF selection unit
325 terminating call relay unit
330 AS
340 I-CSCF

The invention claimed is:

1. An IP multimedia subsystem comprising:
a serving session control apparatus configured to execute session control of user equipment; and
a proxy session control apparatus connected to the serving session control apparatus and located at an interface with an IP access network, wherein
the serving session control apparatus includes
a terminating call acceptance unit configured to accept a terminating call to the user equipment, and
a terminating call relay unit configured to relay terminating call information including an identifier of the user equipment to the proxy session control apparatus in response to acceptance of the terminating call to the user equipment by the terminating call acceptance unit,
the proxy session control apparatus includes
a terminating call processing unit configured to receive the terminating call information from the serving session control apparatus,
a restoration execution unit configured to execute restoration of a subscriber profile linked with the user equipment based on reception of the terminating call information by the terminating call processing unit, and
an address holding unit configured to hold an address of a policy-and-charging apparatus included in a response received from a routing agent along with the execution of the restoration by the restoration execution unit, and
the restoration execution unit reestablishes a session between the user equipment and the policy-and-charging apparatus based on the address of the policy-and-charging apparatus held by the address holding unit, and causes the user equipment to execute re-registration with the IP multimedia subsystem.

2. The IP multimedia subsystem according to claim 1, wherein
based on the identifier included in the terminating call information, the restoration executing unit determines whether or not the subscriber profile linked with the user equipment is held, and
the restoration executing unit executes the restoration when the subscriber profile is not held or when the subscriber profile is missing.

3. The IP multimedia subsystem according to claim 1, wherein
the restoration execution unit executes the restoration in a state where the terminating call processing unit suspends the terminating call to the user equipment, and
after the restoration is completed, the terminating call processing unit processes the terminating call to the user equipment.

4. The IP multimedia subsystem according to claim 1, wherein
the serving session control apparatus includes an apparatus selection unit configured, when the serving session control apparatus detects that the proxy session control apparatus holding the subscriber profile is not operating normally, to select a proxy session control apparatus different from the proxy session control apparatus, and
the terminating call relay unit relays the terminating call information to the different proxy session control apparatus.

5. The IP multimedia subsystem according to claim 1, wherein
the terminating call processing unit rejects the terminating call to the user equipment when there is a failure of a transmission line between the proxy session control apparatus and the policy-and-charging apparatus, and
the serving session control apparatus includes an apparatus selection unit configured, when the terminating call to the user equipment is rejected by the terminating call processing unit, to select a proxy session control apparatus different from the proxy session control apparatus.

6. A proxy session control apparatus constituting an IP multimedia subsystem and located at an interface with an IP access network, comprising:
   a terminating call processing unit configured to receive terminating call information from a serving session control apparatus configured to execute session control of user equipment, the terminating call information including an identifier of the user equipment and being relayed in response to acceptance of a terminating call to the user equipment;
   a restoration execution unit configured to execute restoration of a subscriber profile linked with the user equipment based on reception of the terminating call information by the terminating call processing unit; and
   an address holding unit configured to hold an address of a policy-and-charging apparatus included in a response received from a routing agent along with the execution of the restoration by the restoration execution unit, wherein
   the restoration execution unit reestablishes a session between the user equipment and the policy-and-charging apparatus based on the address of the policy-and-charging apparatus held by the address holding unit, and causes the user equipment to execute re-registration with the IP multimedia subsystem.

7. A communication control method implemented by an IP multimedia subsystem provided with
a serving session control apparatus configured to execute session control of user equipment, and
a proxy session control apparatus connected to the serving session control apparatus and located at an interface with an IP access network,
the method comprising the steps of:
causing the serving session control apparatus to accept a terminating call to the user equipment;
causing the serving session control apparatus to relay terminating call information including an identifier of the user equipment to the proxy session control apparatus in response to acceptance of the terminating call to the user equipment;
causing the proxy session control apparatus to execute restoration of a subscriber profile linked with the user equipment based on reception of the terminating call information; and
causing the proxy session control apparatus to hold an address of a policy-and-charging apparatus included in a response received from a routing agent along with the execution of the restoration, wherein
in the step of causing the proxy session control apparatus to execute restoration, a session between the user equipment and the policy-and-charging apparatus is reestablished based on the held address of the policy-and-charging apparatus, and the user equipment is caused to execute re-registration with the IP multimedia subsystem.

* * * * *